United States Patent Office 3,354,087
Patented Nov. 21, 1967

3,354,087
MINERAL LUBRICATING OIL CONTAINING ACRYLATE THIO POLYMER AS VISCOSITY INDEX IMPROVER
Frederick E. Bailey, Jr., Charleston, W. Va., Edward M. La Combe, Williamsville, N.Y., and Russell H. Raines, Nitro, W. Va., assignors to Union Carbide Corporation, a corporation of New York
No Drawing. Filed July 19, 1966, Ser. No. 566,193
2 Claims. (Cl. 252—48.6)

ABSTRACT OF THE DISCLOSURE

There are disclosed mineral lubricating oils containing as viscosity index improvers polymers of an oil-solubilizing proportion of alkyl acrylate or methacrylate and an alkylthioalkyl acrylate or methacrylate.

---

This application is a continuation-in-part of application Ser. No. 74,220, filed Dec. 7, 1960, now U.S. Patent No. 3,278,500.

The invention relates to polymers of alkythioalkyl and alkylsulfonylalkyl esters, their use as viscosity index additives and sludge dispersing additives for lubricating oils, and to lubricating oil compositions containing them.

It is known in the art that minor amounts of certain materials can be added to lubricating oils to lower the rate of change of viscosity of the oil with change of temperature, that is, to increase the viscosity index of said oils. A high viscosity index is desirable, for example, in automobile engine crankcase lubricating oils, where the oil must be fluid for cold starting, but must still have acceptable load-carrying and friction characteristics at operating temperatures.

Another desirable characteristic of engine lubricating oils is the ability to disperse carbonaceous sludge, and thereby to assist in maintaining general engine cleanliness.

It is an object of the invention to provide useful polymers of alkylthioalkyl and alkylsulfonylalkyl esters. It is another object of the invention to provide polymers which have utility as viscosity index improvers for lubricating oils. A further object of the invention is to provide polymers which have utility as carboneaceous sludge dispersants in lubricating oils. Still another object of the invention is to provide lubricating oil compositions containing therein a minor amount of the novel polymers of the invention.

The polymeric composition of the invention comprises a copolymer which has (1) from about 2 to about 20 weight percent of a recurring structural unit selected from the group consisting of $$-\overset{R}{\underset{|}{C}}H-\overset{R}{\underset{|}{C}}-$$
$$O=\overset{|}{C}-O-R^1-Q-CH_3$$

and $$-\overset{R}{\underset{|}{C}}H-\overset{R}{\underset{|}{C}}-$$
$$O=\overset{|}{C}-O-CH_2-\overset{|}{C}H-CH_2$$
$$\overset{|}{Q} \quad \overset{|}{Q}$$
$$\overset{|}{R^2} \quad \overset{|}{R^2}$$

wherein each R individually is either hydrogen or methyl, $R^1$ is a divalent, saturated hydrocarbon radical having from one to four, and preferably two, carbon atoms, each $R^2$ individually is a monovalent, saturated hydrocarbon radical having from one to four carbon atoms, and Q is either thio (—S—) or sulfonyl (—SO$_2$—); and (2) from about 80 to about 98 weight percent of the recurring structural unit $$-\overset{R}{\underset{|}{C}}H-\overset{R}{\underset{|}{C}}-$$
$$O=\overset{|}{C}-O-R^3$$

wherein each R individualy is either hydrogen or methyl, and $R^3$ is a monovalent, saturated hydrocarbon radical having from one to eighteen carbon atoms.

The polymeric compositions of the invention preferably have reduced viscosities of from about 0.5 to about 3.0. The reduced viscosity of a polymer is an indication of its molecular weight, and is determined by dividing the specific viscosity by the concentration being measured in grams of polymer per 100 milliliters of solvent at a given temperature. The specific viscosity is obtained by dividing the difference between the viscosity of the solution and the viscosity of the solvent by the viscosity of the solvent. Unless otherwise indicated, the reduced viscosity values given in the examples were determined at a concentration of 0.2 gram of polymer in 100 milliliters of benzene at 30° C.

The novel polymers of the invention can be prepared by copolymerizing a mixture which comprises (1) from about 2 to about 20 weight percent of a compound that is represented either by Formula I I
$$R-CH=\overset{R}{\underset{|}{C}}-\overset{O}{\underset{||}{C}}-O-R^1-Q-CH_3$$

or by Formula II

II
$$R-CH=\overset{R}{\underset{|}{C}}-\overset{O}{\underset{||}{C}}-O-CH_2-\overset{|}{C}H-CH_2$$
$$\overset{|}{Q} \quad \overset{|}{Q}$$
$$\overset{|}{R^2} \quad \overset{|}{R^2}$$

wherein each R individually is either hydrogen or methyl, $R^1$ is a divalent, saturated hydrocarbon radical having from one to four carbon atoms, and Q is either thio or sulfonyl; and (2) from about 80 to about 98 weight percent of one or more compounds that are represented by Formula III III
$$R-CH=\overset{R}{\underset{|}{C}}-\overset{O}{\underset{||}{C}}-O-R^3$$

wherein each R individually is either hydrogen or methyl, and $R^3$ is a monovalent, saturated, aliphatic hydrocarbon radical having from one to eighteen carbon atoms.

Exemplary of the esters that are represented by Formula I are 2-methylthioethyl acrylate, 2-methylsulfonylethyl acrylate, 2-methylthioethyl methacrylate, methylsulfonylmethyl crotonate, 3-methylthiopropyl crotonate, 4-methylthiobutyl acrylate, and the like.

Illustrative of the esters that are represented by Formula II are 2,3-bis(methylthio)propyl acrylate, 2,3-bis(methylsulfonyl)propyl acrylate, 2,3-bis(ethylthio)propyl methacrylate, 2,3-bis(isopropylthio)propyl crotonate, 2,3-bis(butylsulfonyl)propyl acrylate, 2-methylthio-3-ethylthiopropyl acrylate, and the like.

The esters that are represented by Formulas I and II can be prepared by methods such as the reaction of the corresponding sulfur-containing alcohol with an acid chloride of acrylic, methacrylic, or crotonic acid, by ester exchange, and the like.

The thio-containing alcohols can be prepared, for example, by reacting an alcohol having a halogen substituent with an alkali metal alkyl sulfide. The following reaction is illustrative:

$$HO-CH_2-CH_2-Cl + NaSCH_3 \longrightarrow$$
$$HO-CH_2-CH_2-S-CH_3 + NaCl$$

The sulfonyl derivative can be prepared by direct oxidation of the corresponding thio-containing alcohol with at least two equivalents of peroxide, such as peracetic acid, hydrogen peroxide, and the like.

Examples of esters which are represented by Formula III include methyl acrylate, methyl methacrylate, ethyl methacrylate, isopropyl crotonate, butyl acrylate, the pentyl acrylates, the hexyl methacrylates, the heptyl crotonates, the octyl acrylates, the nonyl acrylates, the decyl acrylates, the undecyl methacrylates, the dodecyl crotonates, the tridecyl methacrylates, the tetradecyl acrylates, the pentadecyl methacrylates, the cetyl crotonates, the heptadecyl crotonates, the stearyl acrylates, and the like.

In some cases, it is highly desirable to employ two or more esters that are represented by Formula III, provided that at least one of the esters imparts oil-solubilizing properties to the copolymer. Oil-solubilizing properties are usually imparted when the alkyl acrylate, methacrylate, or crotonate has an alkyl group having at least 8 carbon atoms. Highly desirable short chain alkyl esters for employing along with the oil-solubilizing alkyl ester are methyl methacrylate, ethyl methacrylate, methyl acrylate, and ethyl acrylate.

A particularly desirable copolymer for use in the invention is composed of polymerized isodecyl acrylate, methyl methacrylate, and 2-methylthioethyl acrylate.

The polymerization reaction is normally carried out in the presence of a free radical polymerization initiator (catalyst) such as dibenzoyl peroxide, cumene hydroperoxide, diacetyl peroxide, and the like. The catalyst is generally employed in amounts of from about 0.2 to about 2.0 weight percent, based on total monomer weight. The reaction mixture can be heated to the activation temperature of the catalyst, or a material such as cobalt naphthenate can be added in small amounts to cause the peroxide to activate at room temperature, whichever is desired. Normally, the polymerization is carried out at a temperature of from about 20° C. to about 200° C., with heating or cooling as needed to maintain the mixture at the desired temperature.

The time for the polymerization will depend on a variety of factors, such as nature of catalyst, nature of monomers, reaction temperature, and the like, and can vary over a wide range. For example, a suitable reaction time is found in the range of from about one hour to about 200 hours. Atmospheric, sub-atmospheric, or super-atmospherical pressure can be employed, as desired.

Preferably, the polymerization is carried out in solution. Hydrocarbon solvents such as benzene, toluene, xylene, hexane, cyclohexane, heptane, octane, and the like, are preferred for this purpose. If desired, the polymerization can also be carried out as bulk or suspension polymerization processes.

The invention is also directed to lubricating oil compositions which comprise a major amount of a lubricating oil and from aobut 0.1 weight percent to about 4.0 weight percent, based on weight of lubricating oil, of the polymeric compositions of the invention.

The lubricating oil can be any of the commonly known lubricating oils. They can be straight mineral oils or distillates derived from paraffinic, naphthenic, asphaltic, or mixed base crudes. The oils can be refined by conventional methods, such as acid, alkali, or clay refined oils. The oils can be produced by solvent extraction, they can be hydrogenated oils, they can be synthetic oils, and the like. The preferred oils are the mineral lubricating oils having viscosities in the range of from about 30 to about 300 Saybolt universal seconds at 100° F.

Lubricating oil compositions containing therein the polymeric compositions of the invention have improved viscosity indices and improved ability to disperse carbonaceous sludge. This utility is illustrated in the examples which follow.

EXAMPLE 1

(A) *Preparation of 2-methylsulfonylethanol*

A 5 liter, 4 neck, creased reaction flask was fitted with a mechanical stirrer, thermometer, inlet funnel, condenser, and cooling bath. 2-methylthioethanol (552 grams) was stirred at 30° C., or below, while feeding peracetic acid (3735 grams 24.6% solution in ethyl acetate) dropwise over 6 hours. The reaction was exothermic. It was transferred to a boiling flask and stripped free of solvent under reduced pressure, final temperature 95° C./15 mm. The crude 2-methylsulfonylethanol was diluted with 1,000 grams methanol and 4 grams concentrated sulfuric acid. This mixture was heated until all of the methyl acetate was removed, and the catalyst neutralized with 8 grams calcium acetate. The product was filtered and distilled. After a small head cut 145° C./1.5 mm., there was distilled 676 grams of 2-methylsulfonylethanol, $n_D^{20}=1.4771$, at 145–150° C./1.5 mm. which represents a 91% yield. There remained 30 grams of residue.

(B) *Preparation of 2-methylsulfonylethyl acrylate*

A 2 liter, 4 neck, creased reaction flask was fitted with a mechanical stirrer, thermometer, condenser, and heating mantle. The charge:

A mixture of 224 grams 2-methylsulfonylethanol
181 grams acrylyl chloride
0.5 liter benzene was stirred in a reaction flask while heating under reflux for 4 hours (about 80° C.). The product was transferred to a boiling flask and the benzene was stripped off. A 202-gram fraction was then distilled at 150–178° C./1½ mm. Hg. Redistillation of the fraction through a column yielded 85 g. of 2-methylthioethyl acrylate having a boiling range of 145–155° C. at 1.5 mm. and a refractive index $n_D^{30}$ 1.4781–83.

A sample of the monomer, which was found to be water insoluble, and a catalytic amount of dibenzoyl peroxide was heated on a steam bath and formed a hard polymer in about 5 minutes. The polymer was soluble in acetonitrile.

A sample of the monomer was submitted for infrared analysis: 2.9 microns=OH (weak—app. 2% as alcohol); 5.85 microns=conjugated ester C=O; 6.14, 6.17 microns=acrylate C=C; 7.7 microns=$SO_2$; 8.4 microns=ester C—O; 8.85 microns=$SO_2$; 10.2, 10.4 microns=vinyl.

The identity of the subject compound was confirmed by the infrared analysis and the fact that polymer is formed with free racial catalyst.

EXAMPLE 2

(A) *Preparation of 2,3-bis(methylthio)-1-propanol*

2,3-bis(methylthio)-1-propanol was prepared from 2,3-dichloropropanol and sodium methyl sulfide by the following procedure:

A 5 liter, 4 neck, creased reaction flask was fitted with a mechanical stirrer, condenser, and inlet tube. A 25 percent solution of sodium methyl sulfide, $NaSCH_3$, was prepared by dissolving 12.3 mols NaOH in 2374 grams water and bubbling in gaseous $CH_3SH$ until 12.3 mols had been absorbed. The solution was cooled to 40° C. and 774 grams 2,3-dichloropropanol was added dropwise. The reaction was very exothermic. The reaction product was cooled to 40° C. and transferred to a 4 liter separatory funnel. The lower water layer was decanted and the oil layer washed once with distilled water, and decanted. The oil layer was then transferred to a 1 liter boiling flask, and distilled to yield 531 grams of 2,3-bis-(methylthio)-1-propanol having a B.P. 79° C. at 0.7 mm. and $n_D^{30}$ 1.5340–9. Infrared showed no evidence of chlorine at 15.2 microns.

Analysis showed C, 39.4%; H, 8.3% and S, 40.41%. Theory: 39.5%; 7.9% and 42.3%.

(B) *Preparation of 2,3-bis(methylthio)propyl methacrylate*

2,3-bis(methylthio)propyl methacrylate was prepared by ester exchange from 2,3-bis(methylthio) propanol and methyl methacrylate using Mg(OMe)$_2$ catalyst, by the following procedure:

To a 2 liter boiling flask was charged 304 grams 2,3-bis(methylthio)-1-propanol
400 grams methyl methacrylate
600 grams benzene
4 grams Age-rite powder (phenyl-beta-naphthylamine)

The flask was then attached to a vacuum still. The catalyst, 16.7 ml. 20% Mg(OMe)$_2$ in methanol, was then added after drying the system, and the methanol was stripped off. The reaction was very slow, so another 16.7 ml. of catalyst solution was added. After refluxing 6 hours, 188 grams of methanol-benzene, constant boiling mixture, was removed, which had a refractive index of 1.4300 (corresponding to 38% methanol). Refluxing was again continued for 7 hours, and 97 grams additional benzene-methanol having a refractive index of 1.4480, 28% methanol, was removed. The reactants were allowed to cool to room temperature and 20 ml. H$_2$O added to destroy any remaining catalyst. The solution was diluted with 1500 ml. methanol to precipitate any polymer, filtered, and the filtrate stripped free of solvent under vacuum. The product was distilled to yield 258 g. of 2,3-bis(methylthio)propyl methacrylate having B.P. 107–109 at 1.5 mm. and $n_D^{30}$ 1.5090–98.

Analysis showed C, 49.6%; H, 7.6%; S, 27.5%. Theory: C, 49.2%; H, 7.28%; S, 29.1%.

EXAMPLE 3

A citrate bottle (approximately 275 ml. capacity) was flushed with nitrogen and charged:

1.5 grams 2-methylthioethyl acrylate
28.5 grams isodecyl acrylate
30.0 grams heptane
1.0% diacetyl peroxide (25% solution in dimethyl phthalate).

The bottle was reflushed with nitrogen, capped and placed in a bottle bath which rotates end over end at 50° C. for 17.5 hours. Total solids showed 96.5 percent conversion, and a reduced viscosity (0.2 gram resin/100 ml. benzene at 30° C.) of 0.88 was determined for the copolymer.

The sample, in heptane solution was treated with 2 equivalents of peracetic acid (25% solution in ethyl acetate) based on the 2-methylthioethyl acrylate, in order to prepare the sulfonyl derivative. It was allowed to stand at ambient temperature for one hour. The reaction was exothermic. The bottle was then tumbled in a water bath at 50° C. for one hour to insure as much reaction as possible.

The treated resin solution was then diluted with 45 grams of mineral oil, and the heptane removed by distillation. Lab bench-scale dispersion tests showed the copolymer to be a superior dispersant for carbonaceous sludge when mixed with lubricating oils.

EXAMPLES 4–7

The copolymers indicated below were prepared by charging the indicated proportion of monomers to a citrate bottle of 275 ml. capacity along with dry acetone as solvent and 1 weight percent diacetyl peroxide catalyst. The capped bottle was rotated in a constant temperature bath at 50° C. for about 23 hours. The polymer was then worked up in methanol, dried in a forced draft oven at 50° C., dissolved in benzene, diluted with oil, and the benzene was then removed by distillation.

TABLE I

| Example | Weight Percent | Component |
|---|---|---|
| 4 | 1 | 2-methylthioethyl acrylate. |
|  | 99 | Isodecyl acrylate. |
| 5 | 15 | 2-methylthioethyl acrylate. |
|  | 85 | Isodecyl acrylate. |
| 6 | 15 | 2-methylthioethyl acrylate. |
|  | 85 | Isodecyl acrylate. |
| 7 | 15 | 2,3-bis(methylthio)propyl acrylate. |
|  | 85 | Isodecyl acrylate. |

EXAMPLE 8

By a procedure analogous to that of Example 3, a copolymer having the following composition was prepared:

Component: Weight percent
2-methylsulfonylethyl acrylate _____ 9
Isodecyl acrylate _____ 91

EXAMPLE 9

The polymers prepared in Examples 3 through 6 and 8 were tested for their ability to increase the viscosity index of a lubricating oil. The oil employed in all of the tests was a Mid-Continent solvent refined oil, having a viscosity of 150 SUS at 100° F. and having a viscosity index of 102. The results of the evaluation tests are shown in the table below.

TABLE II.—VISCOSITY INDEX EVALUATION

| Example | Reduced Viscosity | Viscosity Index Weight Percent Polymer in Oil | | |
|---|---|---|---|---|
|  |  | 0.75 | 1.5 | 2.0 |
| 3 | 0.88 | 127.5 | 121.7 | 148.8 |
| 4 | 2.59 | 143.2 | 140.4 | 139.2 |
| 5 | 1.69 | 138.8 | 151.1 | 152.6 |
| 6 | 0.85 | 130.7 | 141.2 | 144.6 |
| 8 | 1.61 | 127.5 | 121.7 | 148.8 |

The viscosity indices in the above tests were determined according to the procedure given in ASTM D567–53.

EXAMPLES 10–18

By procedures analogous to that described in Example 3, a series of copolymers were produced from isodecyl acrylate, methyl methacrylate, and 2-methylthioethyl acrylate. The table below displays the exact polymer compositions, the reduced viscosities of the polymers, the viscosity indexes of Procoil 200A Oil containing 4.95 weight percent of Lubrizol 1739 (a commercial additive package containing zinc dialkyldithiophosphate, barium sulfonate, and oxidation inhibitors), and the results of dispersion tests. The viscosity indexes were determined by ASTM D567–53, and the dispersion test was performed by adding 6.0 grams of carbon paste (20 percent carbon black in mineral oil) to 105 milliliters of a solution of 0.4 gram of polymer in kerosene and then pouring the dispersion into 50-milliliter graduates. If no phase separation occurred within 96 hours the polymer was indicated to be a dispersant. Table III displays the results of the experiments:

TABLE III

| Example | Polymer Composition, Wt. percent | | | Reduced Viscosity | Viscosity Index | | Dispersant |
| --- | --- | --- | --- | --- | --- | --- | --- |
| | Isodecyl Acrylate | Methyl Methacrylate | 2-methyl-thioethyl Acrylate | | 1% Polymer | 1.6% Polymer | |
| 10 | Control, no polymer | | | | 96 | | |
| 11 | 90 | 6 | 4 | 1.04 | 124 | 132 | Yes. |
| 12 | 86 | 10 | 4 | 0.97 | 128 | 134 | Yes. |
| 13 | 84 | 12 | 4 | | 130 | 136 | Yes. |
| 14 | 86 | 12 | 2 | | 129 | 137 | Yes. |
| 15 | 83 | 11 | 6 | 1.28 | 131 | 141 | Yes. |
| 16 | 85 | 10 | 5 | 1.24 | 134 | 140 | Yes. |
| 17 | 83.4 | 9.8 | 6.8 | 1.37 | 134 | 143 | Yes. |
| 18 | 86.5 | 13.5 | | 0.96 | 128 | 142 | No. |

What is claimed is:
1. A lubricating composition comprising a mineral oil of lubricating viscosity and a small amount, sufficient to enhance the viscosity index of said mineral oil, of a resinous copolymer of:
(a) from about 2 to about 20 weight percent of a compound represented by the formula:

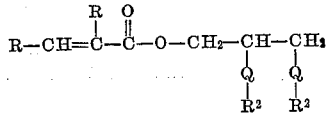

wherein each R individually represents hydrogen or methyl, wherein each $R^2$ individually represents alkyl of from 1 to 4 carbon atoms, and wherein Q represents thio or sulfonyl; and
(b) from about 80 to 98 weight percent of at least one compound of the formula

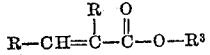

wherein each R individually represents hydrogen or methyl, and wherein $R^3$ represents alkyl of from 1 to 18 carbon atoms provided that sufficient $R^3$ alkyl of at least 8 carbon atoms is present to impart oil solubility to said resinous copolymer.

2. The lubricating composition of claim 1 wherein the copolymer is a copolymer of 2,3-bis(methylthio)propyl arcylate and isodecyl acrylate.

References Cited
UNITED STATES PATENTS

| | | | |
| --- | --- | --- | --- |
| 2,604,453 | 7/1952 | Popkin | 252—56 |
| 2,812,267 | 12/1957 | Garner et al. | 260—79.3 X |
| 2,925,406 | 2/1960 | McCurdy | 260—79.7 X |
| 3,100,748 | 8/1963 | Richards et al. | 252—48.6 X |
| 3,102,863 | 9/1963 | Herbert et al. | 252—48.6 X |
| 3,265,673 | 8/1966 | Richards et al. | 260—79.7 |

DANIEL E. WYMAN, Primary Examiner.

W. H. CANNON, Assistant Examiner.